UNITED STATES PATENT OFFICE.

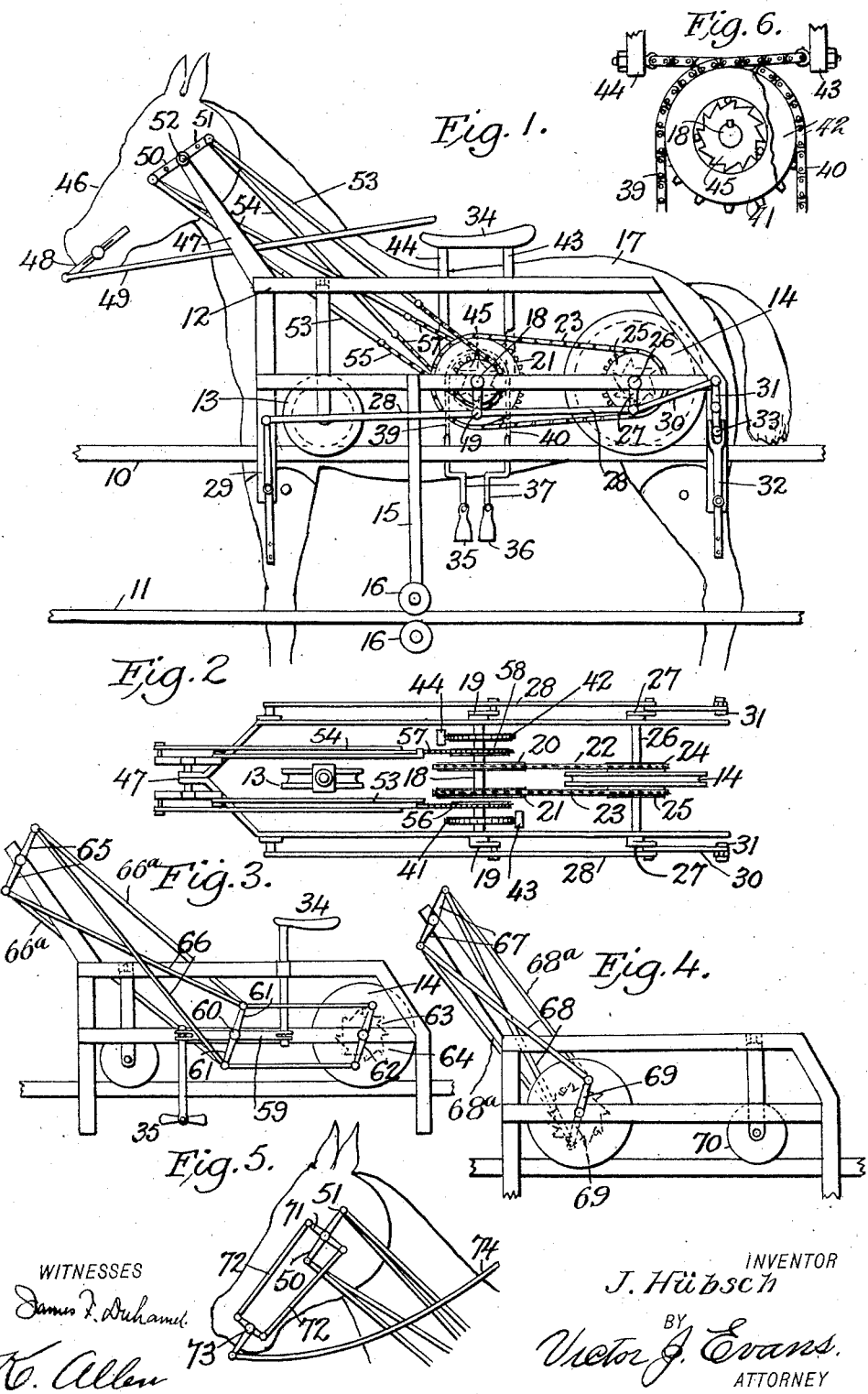

JOSEPH HÜBSCH, OF NEW YORK, N. Y.

MECHANICAL ANIMAL.

No. 868,564.　　　　Specification of Letters Patent.　　　　Patented Oct. 15, 1907.

Application filed May 9, 1906. Serial No. 315,900.

*To all whom it may concern:*

Be it known that I, JOSEPH HÜBSCH, a subject of the Emperor of Austria-Hungary, residing at New York, in the county of New York and State of New York, have invented new and useful Improvements in Mechanical Animals, of which the following is a specification.

My invention relates to mechanical toys and amusement devices and more particular to that class which is intended to represent an animal and is provided with certain mechanism to propel same while being ridden by a person.

These and other objects of the invention are more fully described and detailed in the following specification and pointed out in the appended claims.

In the drawings forming a part of this specification and accompanying same like reference characters are used to designate the same parts in the various figures.

Figure 1 represents a side elevation of the frame and operating mechanism of a mechanical horse, the body of which is shown in outline. Fig. 2 is a plan view of the frame and operating mechanism. Figs. 3, 4 and 5 are modified means of constructing certain details. Fig. 6 is an enlarged detail view of the saddle and stirrup movement.

The animal in these instances is adapted to run upon the main supporting rail 10 which is suitably braced or supported and has in conjunction with it another guide rail 11 a short distance below. The framework 12 of the animal is made up of a certain horizontal and vertical bars and has swiveled near its front end a grooved roller 13 and journaled near its rear end is a driving pulley 14, also grooved to fit the rail 10. Depending from the frame and carried by rod 15, are guide rollers 16, which bear upon the rail 11, so as to keep the animal in its upright position and at the same time assist in supporting it the body of the said animal being made up of two parallel sides one of which is designated as 17.

About midway of the frame 12 is journaled a shaft 18, carrying at its outer ends crank arms 19, and this shaft carries two sprocket wheels 20 and 21 which are made fast to it, and whose chains 22 and 23 pass rearward and around sprocket wheels 24 and 25 on the shaft 26 of the roller 14 this roller being fast on the shaft 26 and clutches are interposed between said sprocket wheels and shaft 26. This shaft 26 is also provided with crank arms 27 on its outer ends and these crank arms are connected by means of rod 28 with the levers 29, controlling the movements of the front legs of the animal, while the hind legs are moved by means of link or connecting-rod 30 and levers 31 and 32. The latter being forked at its upper end to receive the lateral pins 33 of the lever 31.

In no case are both sets of crank arms 19 and 27 connected, employed or used conjointly since crank arms 19 produce slow leg motion and crank arms 27 quick motion, only one set can be employed whichever may be desired, depending entirely what animal figure is chosen and how fast leg motion is required in proportion to the speed of the device.

The shaft 18 receives power from several sources, the first being the rider of the animal who is seated in the saddle 34 and whose feet are carried by the stirrups 35 and 36, the former being for the right foot of the rider and the latter stirrup adapted to receive his left foot. The stirrups are carried by the rods 37, which are off-set as shown in Fig. 1 in order to aline them in position nearly opposite to each other on each side of the horse, and these rods 37 have secured to their upper end chains 39 and 40 which pass respectively around sprocket wheels 41 and 42 and whose other ends are secured to depending rods 43 and 44 on the saddle 34.

Each downward motion of either the stirrups or the saddle produces a forward or propelling motion by means of clutches 45 interposed between the shaft 18, and sprocket wheels 41 and 42. When the stirrups 35 and 36 are moved down stirrup 36 rotates sprocket wheel 41 forward thus propelling shaft 18, while stirrup 35 turns sprocket wheel 42 back or rearward loosely, on the shaft 18, when the saddle 34 is moved down, depending rod 44 rotates sprocket wheel 42 forward thus producing a forward propelling motion on shaft 18, while depending rod 43 turns sprocket wheel 41, loosely, back or rearward on shaft 18. The stirrups lift the saddle and the saddle lifts the stirrups, according as the rider places his weight on his feet and stirrups respectively or his body on the saddle accordingly. Although both stirrups move down together only one of them propels and so with the saddle, although there are two rods that move down, 43 and 44, only one of them propels. In other words each movement produces forward propelling motion and reversing motion at the same time be it saddle or stirrups.

Motion is also given the shaft 18 by means of the movement of the head of the animal 46 which is pivoted to the upper end of the upright 47, and has at the point which the animal's mouth is located an adjustable bit 48, rigidly secured thereto and provided with a rigid bridle 49 which the driver uses to rock the head 46 by means of his hands. In rocking the head he likewise moves the arms 50 and 51 carried by the pivot 52, and these arms are connected with the rods 53 and 54, each of the rods 53 carrying a sprocket chain 55 which passes around a sprocket wheel 56, while the rods 54 are adapted to cross each other, and have offset ends to which are connected the chains 57, passing around a sprocket wheel 58. These two sprocket wheels 56 and 58 are also provided with clutches which cause them when they move to propel the shaft 18, in the same direction as the sprocket wheels 41 and 42.

In the modified form shown in Fig. 3 I dispense with the system of chains and sprocket wheels and use levers 59, which are operated by the saddle 34 and the stirrups 35 and 36 to actuate the pivotal shaft 60 and the crank arms 61 carried thereby. These crank arms 61 operate similar arms 62 of the driving shaft 63, which in conjunction with the clutch 64 drives the roller 14 to propel the device. The head of the animal is provided with crank arms 55 which also assist in operating the crank arm 61 through the medium of the links 66ª and the duplicate links 66 provided for the two sides of the device.

In Fig. 4 the means illustrated to drive the device is a series of crank arms 67 pivoted with the head of the animal to the framework and when the same is oscillated these arms through links 68ª operate the crank arms 69 on the driving shaft and through the means of any well known clutch mechanism propels the driving roller. In this case the supplemental roller 70 is situated at the rear of the frame.

In Fig. 5 is shown means for operating the driving shaft of the device while the head is permitted to remain stationary and as will be clearly seen the crank arms 50 and 51 are provided with the arms 71 connected by means of links 72 with the three arms levers 73, and when the rider pulls and pushes on the bridle 74 these levers and arms are actuated so as to impart motion to the chains 55 and 57, and to drive their respective sprocket wheels.

It is obvious that various other modified means may be resorted to, to effect certain operations which are illustrated and above described without departing from the essential features which are referred to.

What I claim as new and desire to secure by Letters Patent is:—

1. In a mechanical animal a frame mounted on rollers including a traction roller, a saddle and stirrups, link belts connecting the saddle with the stirrups, and shaft carrying pulleys supporting the link belts, clutch means connecting the pulleys with the shaft, and means for transmitting motion from the shaft to the traction roller.

2. In a mechanical animal a frame having supporting rollers including a traction roller, a vertically movable saddle having depending rods, vertically movable stirrup carrying rods, a shaft, pulleys upon said shaft, clutch means connecting the pulley with the shaft, link belts guided over the pulleys and connecting the stirrup carrying rods with the rods depending from the saddle, and means for imparting continuous motion in one direction from the shaft to the traction roller.

3. In a mechanical toy of the class described, the combination of a frame having supporting rollers including a traction roller, a driving shaft, a pivoted head, means for transmitting motion from the pivoted head to the driving shaft, means for transmitting motion from the latter to the traction roller, and means to be actuated by the rider for working the pivoted head.

4. In a mechanical animal, a frame having supporting rollers including a traction roller, a driving shaft, means for transmitting motion from the driving shaft to the traction roller, a rocking member constituting the head of the animal, means for transmitting motion from the rocking member to the driving shaft, and a bridle member connected with the rocking member at a point distant from its fulcrum for actuating the same.

5. In a mechanical animal, a frame having supporting rollers including a traction roller, a driving shaft, means for transmitting motion from the driving shaft to the traction roller, a rocking head member having radial arms, pulleys mounted upon the driving shaft, clutch members connecting said pulleys with the driving shaft, a chain engaging one of said pulleys, links connecting the ends of said chain with the radial arms of the rocking head member, a chain engaging the other pulley, and crossed links connecting the ends of said chain with the radial arms of the rocking head member.

6. In a mechanical animal, a frame mounted upon rollers including a traction roller, a driving shaft, means for transmitting motion from the driving shaft to the traction roller, a rocking head member, means for transmitting motion from the rocking head member to the driving shaft and a rigid bridle member connected with the rocking head for actuating the latter by the hands of the operator.

7. In a mechanical animal, a frame mounted upon rollers including a traction roller, a driving shaft, means for transmitting motion from the driving shaft to the traction roller, and means for actuating the driving shaft including a vertically movable saddle and stirrups and a rocking head adapted to be actuated conjointly by the feet and the hands of the operator while seated upon the saddle.

8. In a mechanical animal, a track, a frame mounted upon rollers engaging said track, including a traction roller, a driving shaft, means for transmitting motion from the driving shaft to the traction roller, and means for actuating the driving shaft by the conjoint movement of the body, feet and hands of the operator, said means including a vertically movable saddle and stirrups, a rocking head, a rigid bridle member pivotally connected with the head at a distance from its pivotal point, and means for transmitting motion to the driving shaft from the saddle, the stirrups and the rocking head.

In testimony whereof, I affix my signature in presence of two witnesses.

JOSEPH HÜBSCH.

Witnesses:
JAMES F. DUHAMEL,
H. G. HOSE.